United States Patent
Ullah

(10) Patent No.: US 11,435,136 B2
(45) Date of Patent: Sep. 6, 2022

(54) VENDING MACHINE REFRIGERATION MODULE

(71) Applicant: Ice Qube, Inc., Greensburg, PA (US)

(72) Inventor: Jamshaid Ullah, Shenzhen (CN)

(73) Assignee: Ice Qube, Inc., Greensburg, PA (US)

( * ) Notice: Subject to any disclaimer, the term of this patent is extended or adjusted under 35 U.S.C. 154(b) by 239 days.

(21) Appl. No.: 16/675,746

(22) Filed: Nov. 6, 2019

(65) Prior Publication Data
US 2020/0149803 A1 May 14, 2020

(30) Foreign Application Priority Data

Nov. 21, 2018 (CN) .......................... 201811389324.3

(51) Int. Cl.
*F25D 29/00* (2006.01)
*G05B 6/02* (2006.01)

(52) U.S. Cl.
CPC ............. *F25D 29/003* (2013.01); *G05B 6/02* (2013.01)

(58) Field of Classification Search
CPC .... F25D 2700/12; F25D 29/003; G07F 9/105; F25B 49/02; F25B 2600/112; F25B 2600/111; F25B 2600/0253; F25B 2600/021; F25B 2700/2104; G05B 6/02
See application file for complete search history.

(56) References Cited

U.S. PATENT DOCUMENTS

| | | | |
|---|---|---|---|
| 2009/0306820 A1* | 12/2009 | Simmons | G07F 9/105 700/244 |
| 2013/0248165 A1* | 9/2013 | Kandasamy | B60H 1/3232 165/271 |
| 2016/0178266 A1* | 6/2016 | Malwitz | H02P 1/00 62/89 |
| 2017/0356668 A1* | 12/2017 | Goel | F24F 11/30 |

FOREIGN PATENT DOCUMENTS

GB       2528215 A  *  1/2016  ............. F24F 11/83

* cited by examiner

*Primary Examiner* — Schyler S Sanks
(74) *Attorney, Agent, or Firm* — Gabriel & Co; Andrew M Gabriel

(57) ABSTRACT

The invention belongs to the technical field of vending machines and provides a vending machine refrigeration module, including a compressor, an evaporator, a condenser controller and a temperature sensor. The temperature sensor feeds back a detected temperature value to the controller. The detected temperature value is compared with a set temperature value to automatically adjust the motor speed of the compressor, the fan speed of the evaporator, and the fan speed of the condenser. The refrigeration module provided by the invention can automatically adjust the rotation speed of the compressor motor, the evaporator fan and the condenser fan according to the temperature detected by the temperature sensor, thereby avoiding full speed operation and reducing energy consumption and avoiding energy waste, improving energy efficiency.

13 Claims, 5 Drawing Sheets

VENDING MACHINE REFRIGERATION MODULE

CROSS-REFERENCE TO RELATED APPLICATIONS

This application claims priority to Chinese patent application CN 201811389324.3, filed Nov. 11, 2018, the entire contents of which are incorporated by reference herein.

TECHNICAL FIELD

The invention belongs to the technical field of vending machines, and in particular relates to a vending machine refrigeration module.

BACKGROUND

With the continuous breakthrough of refrigeration technology, refrigeration systems with good refrigeration performance, large air volume and stable performance continue to appear on the market. As a new type of refrigeration family, refrigeration modules are increasingly favored by consumers. At present, the vending machine refrigeration module in the vending industry is in a fixed-speed full-speed operation mode, which is immature in some aspects, which is reflected in the fact that the regulation of temperature cannot be automatically adjusted, and the effective utilization rate of energy is not high, resulting in energy waste.

BRIEF SUMMARY

In summary, one embodiment provides a vending machine refrigeration module, comprising: a compressor and a condenser operatively coupled to one another; and a controller configured to use a working temperature value obtained from a temperature sensor to automatically adjust a motor speed of the compressor and a fan speed of the condenser.

In an embodiment, the vending machine refrigeration module comprises an evaporator and the controller is configured to use the working temperature value to automatically adjust a fan speed of the evaporator.

In an embodiment, the vending machine refrigeration module controller is configured to: use the working temperature value to determine a difference to another value; and adjust the motor speed of the compressor, the fan speed of the condenser, and the fan speed of the evaporator based on the difference.

In an embodiment, the vending machine refrigeration module controller is configured to: in a condition where the difference is below a predetermined amount, stop the motor of the compressor and the fan speed of the condenser and run the fan of the evaporator.

Another embodiment provides a vending machine comprising: a refrigeration module having a compressor, an evaporator, a condenser, a controller, and a temperature sensor; the controller respectively electrically connecting with the compressor, the evaporator, the condenser, and the temperature sensor; the temperature sensor configured to feed back a detected temperature value to the controller, and the controller configured to automatically adjust a motor speed of the compressor, a fan speed of the evaporator, and a fan speed of the condenser according to the temperature value detected by the temperature sensor and a set temperature value.

In an embodiment, the vending machine controller is configured to adjust a motor of the compressor, a fan of the evaporator, and a fan of the condenser to start operation after determining that a difference between a temperature value detected by the temperature sensor and the set temperature value is not zero.

In an embodiment, the vending machine controller is configured to, after determining that the difference between the temperature value detected by the temperature sensor and the set temperature value is zero, adjust the motor of the compressor and the fan of the condenser to stop running, and adjust the fan of the evaporator to start running.

In an embodiment, the vending machine compressor is an AC variable frequency compressor or an inverter compressor.

In an embodiment, the vending machine controller is configured to adjust the motor speed of the compressor, the fan speed of the evaporator, and the fan speed of the condenser in a linear fashion.

In an embodiment, the motor speed of the compressor is adjusted from 0% to 100%, the fan speed of the condenser is adjusted from 0% to 100%, and the fan speed of the evaporator is adjusted from 10% to 100%.

In an embodiment, the vending machine temperature sensor is a thermistor sensor or a thermocouple sensor.

A further embodiment provides a method, comprising: assembling a refrigeration unit of a vending machine, the refrigeration unit including a controller; and configuring the controller to use a working temperature value from a temperature sensor of a vending machine to automatically adjust, with the controller, a motor speed of a compressor and a fan speed of a condenser.

DETAILED DESCRIPTION

Figure 1:
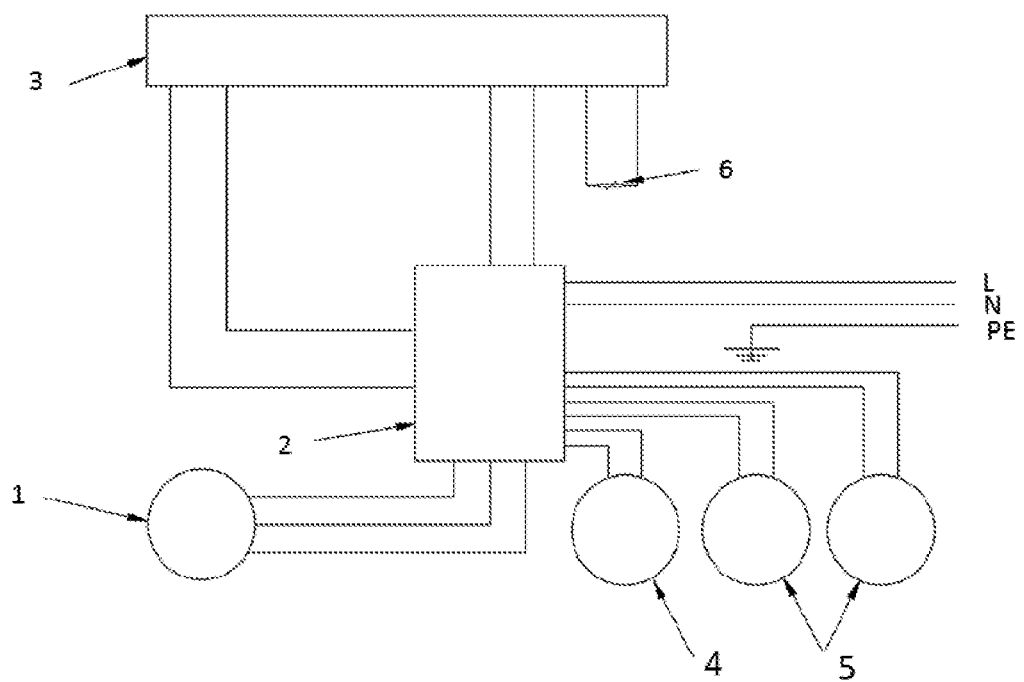
FIG. 1 is a schematic overall structural view of a refrigerating machine refrigeration module according to an embodiment of the present invention.
Figure 2:
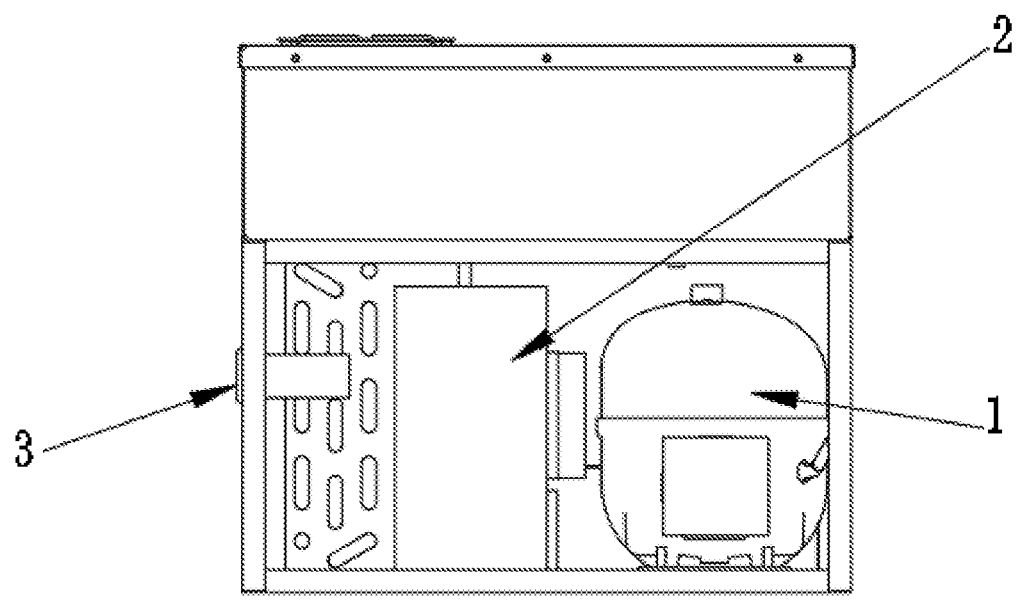
FIG. 2 is a partial structural schematic view of the vending machine refrigeration module shown in FIG. 1.
Figure 3:
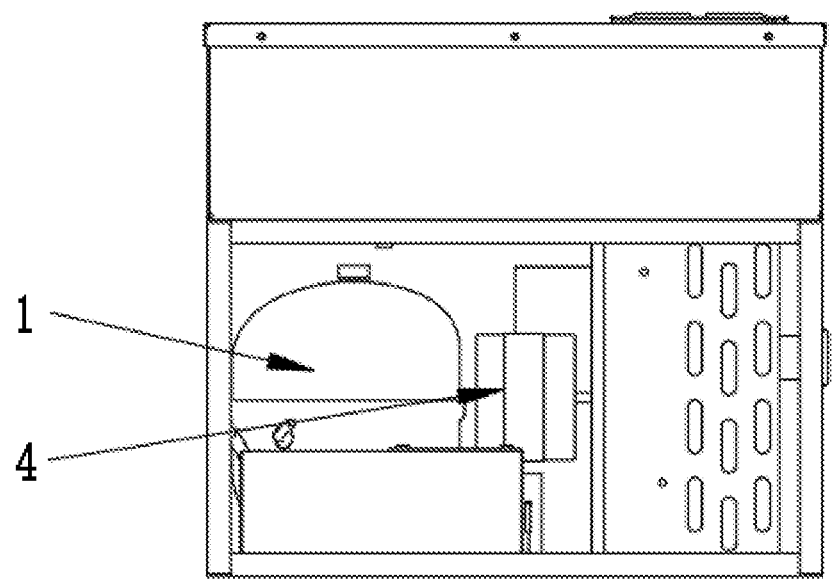
FIG. 3 is a partial structural schematic view of the vending machine refrigeration module shown in FIG. 1.
Figure 4:
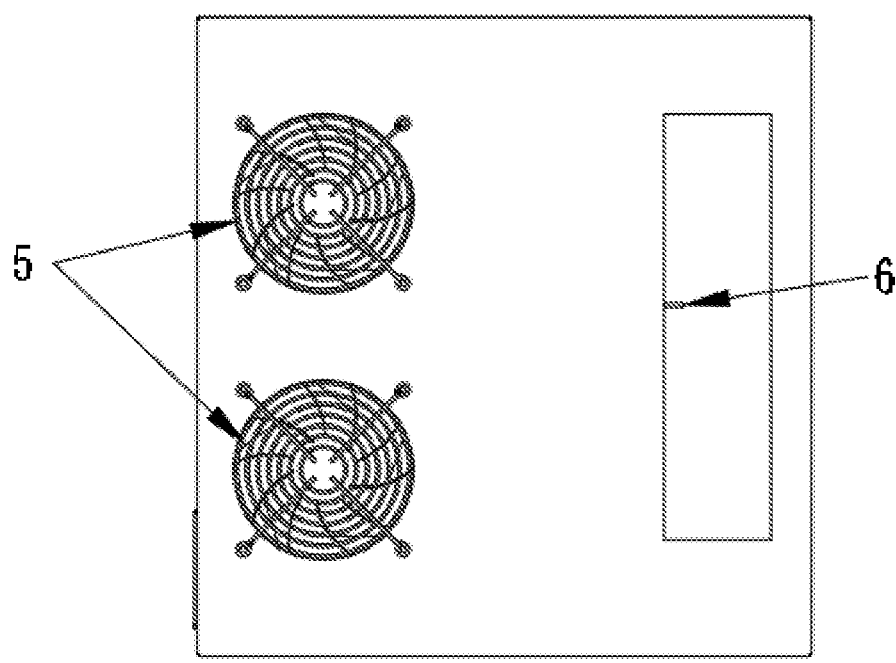
FIG. 4 is a partial structural schematic view of the vending machine refrigeration module shown in FIG. 1.

The technical problem to be solved by the embodiments of the present invention is to provide a vending machine refrigeration module, which aims to solve the problem that the automatic utilization rate of the automatic vending machine refrigeration module in the prior art is not high, resulting in waste of energy.

An embodiment of the present invention is implemented as follows. A vending machine refrigeration module includes a compressor, an evaporator, and a condenser, the compressor being an inverter compressor. The refrigeration module further comprises a controller and a temperature sensor. The controller is electrically connected to the inverter compressor, the evaporator, the condenser, and the temperature sensor, respectively. The temperature sensor feeds back a detected temperature value to the controller, and the controller compares the temperature value detected by the temperature sensor with the set temperature value and automatically adjusts the motor speed of the compressor, the fan speed of the evaporator, and the fan speed of the condenser. When the temperature value detected by the temperature sensor, the controller adjusts the motor of the compressor, the fan of the evaporator, and the fan of the condenser to start operation when the difference between the set temperature value is not zero. When the difference between the temperature value detected by the temperature sensor and the set temperature value is zero, the controller adjusts a motor of the compressor and a fan of the condenser to stop running, and adjusts the fan of the evaporator to start running.

In an embodiment, the compressor is an AC variable frequency compressor.

In an embodiment, the controller adjusts the compressor speed and the manner in which the evaporator and the fan speed on the condenser are linearly adjusted.

In an embodiment, the adjustment range of the compressor rotation speed is 0% to 100%.

In an embodiment, the adjustment range of the condenser fan speed is 0% to 100%.

In an embodiment, the adjustment range of the evaporator fan speed is 10% to 100%.

In an embodiment, the temperature sensor is a thermistor sensor.

In an embodiment, the temperature sensor is a thermocouple sensor.

Compared with the prior art, an embodiment has the beneficial effects that the embodiment includes: a compressor, an evaporator, a condenser controller and a temperature sensor. The compressor is an inverter compressor. The controller is respectively connected with the compressor, the evaporator and the condensation unit. The temperature sensor is electrically connected as well. The temperature sensor feeds back the detected temperature value to the controller, and the controller automatically adjusts the motor speed of the compressor and the fan of the evaporator according to the temperature value detected by the temperature sensor and the set temperature value. When the difference between the temperature value detected by the temperature sensor and the set temperature value is not zero, the controller adjusts the motor of the compressor, the fan of the evaporator, and the fan of the condenser to start the operation. When the difference between the temperature value detected by the temperature sensor and the set temperature value is zero, the controller adjusts the fan of the compressor and the fan of the condenser to stop running, and adjusts the start-up operation of the fan of the evaporator.

Therefore, when the temperature in the vending machine reaches the working requirement, the speed of the compressor motor, the evaporator fan and the condenser fan can be adjusted in time to avoid full speed operation, thereby reducing energy consumption, avoiding energy waste, and improving energy utilization rate.

The present invention will be further described in detail below with reference to the accompanying drawings and embodiments. It is understood that the specific embodiments described herein are merely illustrative of the invention and are not intended to limit the invention.

As shown in FIG. 1 to FIG. 4, an embodiment provides a vending machine refrigeration module. The embodiment includes a controller 3 and a temperature sensor 6, and the controller 3 is respectively coupled to the compressor 1, the evaporator 5, and the condensation. The controller 4 and the temperature sensor 6 are electrically connected. The compressor 1 is an inverter compressor. The temperature sensor 6 feeds back the detected temperature value to the controller 3. The controller 3 performs comparing of the temperature value detected by the temperature sensor 6 and the set temperature value. The motor speed of the compressor 1, the fan speed of the evaporator 5, and the fan speed of the condenser 4 is automatically adjusted based on the comparing.

When the difference between the temperature value detected by the temperature sensor 6 and the set temperature value is not zero, the controlling is performed. The controller 3 adjusts the motor of the compressor 1, the fan of the evaporator 5, and the fan of the condenser 4 to start the operation. When the difference between the temperature value detected by the temperature sensor 6 and the set temperature value is zero, the controller 3 adjusts the motor of the compressor 1 and the fan of the condenser 4 are stopped, and the fan of the evaporator 5 is adjusted to start the operation. Therefore, when the temperature in the vending machine reaches the working requirement, the speed of the motor of the compressor 1, the fan of the evaporator 5, and the fan of the condenser 4 can be adjusted in time to avoid full speed operation, thereby reducing energy consumption and avoiding waste of energy, improving energy efficiency.

In the above embodiment, the compressor 1 includes a drive board 2 for supplying power to the controller 3. The working process of the vending machine refrigeration module of this embodiment is as shown in FIG. 1. The power source L, N, PE is input to the driving board 2 of the compressor 1, the driving board 2 is supplied with power to the controller 3, and the controller 3 is based on the temperature sensor 6 measured temperature to determine the start or stop of the motor of the compressor 1 and the fan on the evaporator 5, the condenser 4, if it is started, after the start, according to the temperature measured by the temperature sensor 6 and the temperature set by the user to compare. The motor speed of the compressor 1, the fan speed of the evaporator 5, and the fan speed of the condenser 4 are thus adjusted. Preferably, the compressor 1 is an AC variable frequency compressor.

Figure 5:
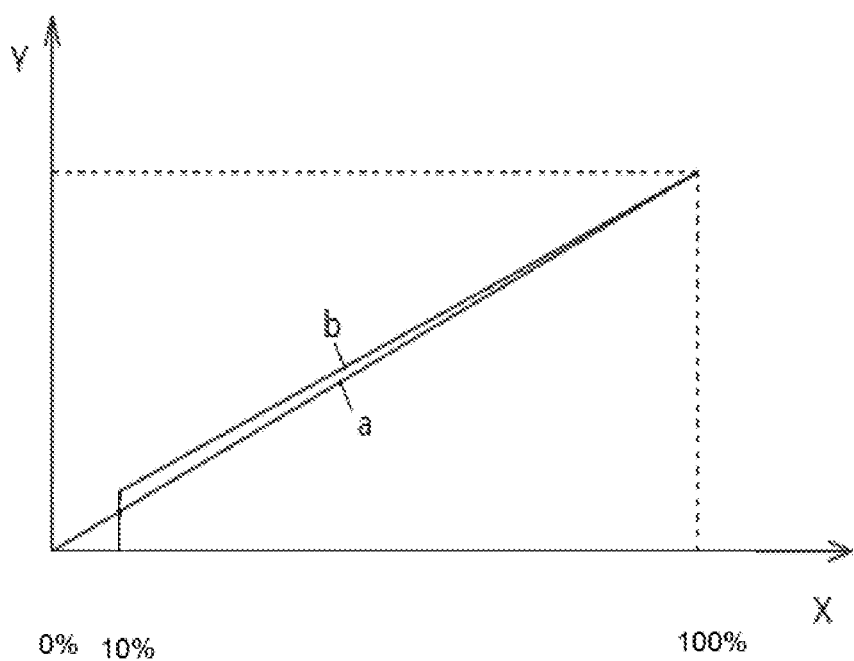
FIG. 5 is a schematic diagram showing the corresponding temperature speed relationship of the vending machine refrigeration module shown in FIG. 1.

In the above embodiment, the manner in which the controller 3 adjusts the motor rotation speed of the compressor 1, the fan speed of the evaporator 5, and the fan speed of the condenser 4 is linearly adjusted. As shown in FIG. 5, a temperature value is set according to requirements, and the difference between the temperature detected by the temperature sensor 6 and the set temperature is set to the Y variable, and the motor speed and evaporation of the compressor 1 controlled by the controller 3 are as shown. The fan speed of the unit 5 and the fan speed of the condenser 4 are set to X variables, and the relationship between them is shown in FIG. 5.

The relationship between the detected temperature and the set temperature is related to the motor speed of the compressor 1 and the fan speed of the condenser 4, which is indicated by the "a" line, and the difference between the detected temperature and the set temperature is related to the fan speed of the evaporator 5 is expressed by the "b" line in FIG. 5. It can be seen from the figure that the greater the difference between the measured temperature and the set temperature, the larger the fan speed of the motor of the compressor 1 and the condenser 4, and the fan speed of the evaporator 5 remains unchanged first, and then gradually increases.

When the difference between the detected temperature and the set temperature is 0%, the motor of the compressor 1 and the fan of the condenser 4 are stopped, and the fan of the evaporator 5 is operated at 10%. As the difference between the detected temperature and the set temperature changes within a certain range, the fan of the evaporator 5 is correspondingly regulated at 10% to 100%, and will not stop, and the fan of the compressor and the fan of the condenser Both are adjustable between 0% and 100%. In addition, the temperature sensor 6 is a thermistor sensor. Optionally, the temperature sensor 6 can also be a thermocouple sensor, as long as the sensitivity can be ensured, which is not limited in the embodiment of the present invention.

In summary, the present invention includes a controller 3 and a temperature sensor 6, and the controller 3 is electrically connected to the compressor 1, the evaporator 5, the condenser 4, and the temperature sensor 6, respectively. The compressor 1 is an inverter compressor. The compressor 1 is powered, the driving board 2 of the compressor 1 supplies power to the controller 3, and the temperature sensor 6 feeds back the detected temperature value to the controller 3. The controller 3 detects the temperature value and the set temperature according to the temperature sensor 6. The value is compared to automatically adjust the motor speed of the compressor 1, the fan speed of the evaporator 5, and the fan speed of the condenser 4. When the difference between the temperature value detected by the temperature sensor 6 and the set temperature value is not zero, the controller 3 adjusts the motor of the compressor 1, the fan of the evaporator 5, and the fan of the condenser 4 to start the operation. When the difference between the temperature value detected by the temperature sensor 6 and the set temperature value is zero, the controller 3 adjusts the motor of the compressor 1 and the fan of the condenser 4 to stop, and the fan of the evaporator 5 is adjusted to start operation. Therefore, when the temperature in the vending machine reaches the working requirement, the speed of the motor of the compressor 1, the fan of the evaporator 5, and the fan of the condenser 4 can be adjusted in time to avoid full speed operation, thereby reducing energy consumption and avoiding waste of energy and improve energy efficiency.

The above is only the preferred embodiment of the present invention, and is not intended to limit the present invention. Any modifications, equivalent substitutions and improvements made within the spirit and principles of the present invention should be included in the protection of the present invention and considered within the scope of the appended claims.

What is claimed is:

1. A vending machine refrigeration module, comprising:
a compressor, an evaporator, and a condenser operatively coupled to one another; and
a controller configured to use a working temperature value obtained from a temperature sensor to automatically adjust a motor speed of the compressor, a fan speed of the evaporator, and a fan speed of the condenser;
wherein, responsive to a difference in the working temperature value and a set temperature, the controller is configured to adjust the motor speed of the compressor and the fan speed of the condenser in a linear fashion;
wherein, responsive to a difference in the working temperature value and the set temperature, the controller is configured to adjust the fan speed of the evaporator in a linear fashion; and
wherein, in a condition where the difference in the working temperature value and the set temperature is below a predetermined amount, the controller is configured to stop the motor of the compressor and the fan speed of the condenser and run the fan of the evaporator;
whereby the fan of the evaporator will not stop and remains running at least at a predetermined rate.

2. The vending machine refrigeration module of claim 1 wherein said temperature sensor is a thermistor sensor.

3. The vending machine of claim 1, wherein the temperature sensor is a thermocouple sensor.

4. The vending machine refrigeration module of claim 1, wherein the predetermined rate is 10%.

5. A vending machine comprising:
a refrigeration module having a compressor, an evaporator, a condenser, a controller, and a temperature sensor;
the controller respectively electrically connecting with the compressor, the evaporator, the condenser, and the temperature sensor;
the temperature sensor configured to feed back a detected temperature value to the controller, and the controller configured to automatically linearly adjust a motor speed of the compressor and a fan speed of the condenser, and automatically linearly adjust a fan speed of the evaporator, according to the temperature value detected by the temperature sensor and a set temperature value;
wherein, in a condition where the difference in the detected temperature value and the set temperature value is below a predetermined amount, the controller is configured to stop the motor of the compressor and the fan speed of the condenser and run the fan of the evaporator;
whereby the fan of the evaporator will not stop and remains running at least at a predetermined rate.

6. The vending machine of claim 5, wherein the compressor is an AC variable frequency compressor.

7. The vending machine of claim 5, wherein the compressor is an inverter compressor.

8. The vending machine of claim 5, wherein the motor speed of the compressor is adjusted from 0% to 100%.

9. The vending machine of claim 5, wherein the fan speed of the condenser is adjusted from 0% to 100%.

10. The vending machine of claim 5, wherein the fan speed of the evaporator is adjusted from between 10% to 100%.

11. The vending machine of claim 5, wherein the predetermined rate is 10%.

12. A method, comprising:
assembling a refrigeration unit of a vending machine, the refrigeration unit including a controller; and
configuring the controller to use a working temperature value from a temperature sensor of a vending machine to automatically adjust, with the controller, a motor speed of a compressor and a fan speed of a condenser in a linear fashion, and adjust a fan speed of an evaporator in a linear fashion;
wherein, in a condition where the difference in the working temperature value and a set temperature is below a predetermined amount, the controller is configured to stop the motor of the compressor and the fan speed of the condenser and run the fan of the evaporator;
whereby the fan of the evaporator will not stop and remains running at least at a predetermined rate.

13. The method of claim 12, wherein the predetermined rate is 10%.

* * * * *